United States Patent [19]
Foxwell et al.

[11] 3,732,933
[45] May 15, 1973

[54] TRACTOR HYDRAULIC LIFT SYSTEM
[75] Inventors: William J. Foxwell, Troy; James D. Parsons, Birmingham, both of Mich.
[73] Assignee: Ford Motor Company, Dearborn, Mich.
[22] Filed: June 11, 1971
[21] Appl. No.: 152,316

[52] U.S. Cl. ................................. 172/7, 172/9
[51] Int. Cl. ............................... A01b 63/112
[58] Field of Search ..................... 172/7, 9, 8, 10, 172/3, 4, 75

[56] References Cited
UNITED STATES PATENTS
3,575,241   4/1971   McKeon ........................... 172/7 X
3,653,446   4/1972   Kalmon ........................... 172/9 X
3,613,798  10/1971   Mohan et al. ..................... 172/9
3,241,621   3/1966   Bunting .......................... 172/9
3,313,359   4/1967   Jin .............................. 172/12

Primary Examiner—Robert E. Pulfrey
Assistant Examiner—Stephen C. Pellegrino
Attorney—Peter F. Hilder et al.

[57] ABSTRACT

A tractor hydraulic lift system in which the lift system may be controlled by driveline torque, by draft sensed by one of the tractor hitch links or by a position control cam. The mechanism is arranged to permit combinations of position control with draft control and with torque control.

5 Claims, 5 Drawing Figures

INVENTORS
W. J. FOXWELL
J. D. PARSONS
BY
P. F. Hilden
ATTORNEY

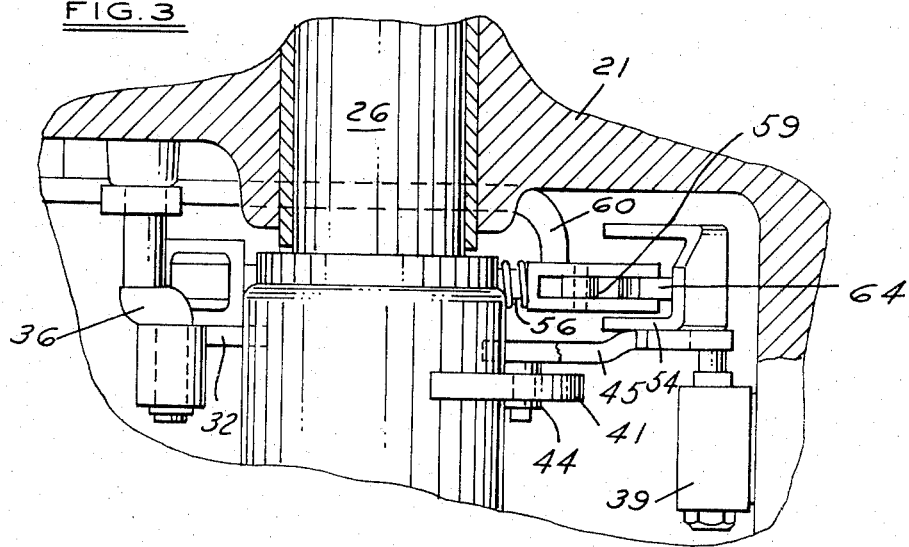
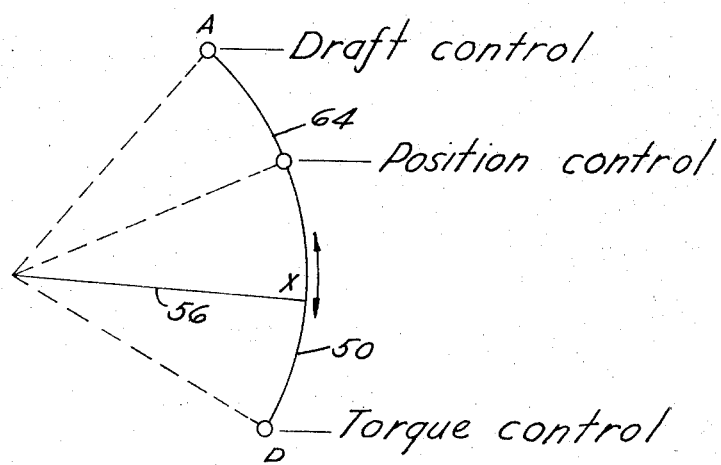
INVENTORS
W. J. FOXWELL
J. D. PARSONS
BY P. P. Hilder
ATTORNEY

TRACTOR HYDRAULIC LIFT SYSTEM

This invention relates to tractors, and more particularly to hydraulic lift systems for tractors.

Agricultural and general purpose tractors usually are provided with a power liftable hitch for supporting an implement mounted on or attached to the tractor. It is usual to provide mechanism for automatic lifting or lowering of the implement in order to maintain a more or less uniform implement draft or load on the tractor, which is measured by the force or reaction on the top link or lower links of the tractor hitch. Customarily, the force exerted on the tractor links is sensed by displacement of a spring, and forces above or below that selected for operation result in raising or lowering the hitch to bring implement draft within the range selected. It also is usual to provide automatic height control of the hitch, in which the hitch is maintained at an elevation corresponding to the position of a control lever, known as "position control".

U.S. Pat. No. 3,575,241 of Apr. 20, 1971, issued on the invention of Charles E. McKeon, Willard G. Smith and William Lomas disclosed a mechanism for sensing the torque in the drive line behind the tractor transmission and automatically adjusting the height of the implement to maintain the torque within a selected range.

The device of the present invention, which is an improvement on the construction shown in that patent, provides for regulation of the height of an implement responsive either to implement draft as sensed by the reaction on the hitch, to drive line torque or to height of the hitch above the ground.

Among the objects of the present invention are to provide a tractor having means by which an attached ground-engaging implement is automatically raised or lowered in response to drive line torque of the tractor, or, alternatively, in response to draft reaction on the implement hitch; to provide such a tractor in which an attached implement can alternatively be maintained at a fixed height or position; to provide such a tractor in which the control of implement height may readily be selected between torque control, position control and draft control; and generally to improve tractor mechanisms of the type described.

Other objects, and objects relating to details and economies of construction and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming a part of this specification in which:

FIG. 3 is a horizontal section taken generally on the line 3—3 FIG. 2.

FIG. 4 is a diagrammatic drawing showing operation of the mechanism for selecting between torque control, position control and draft control.

Figure 1:
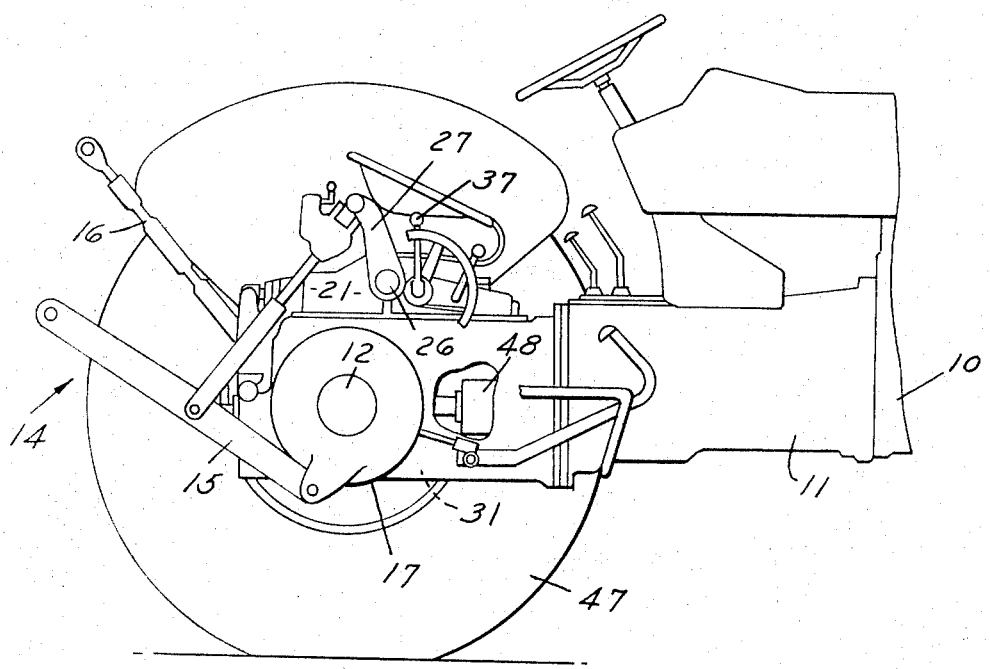
FIG. 1 is a somewhat diagrammatic side elevation of a tractor according to the present invention, only the rear portion of the tractor being shown.

Referring now to FIG. 1, the tractor of the present invention is generally similar to the tractor shown in Roeder U.S. Pat. No. 2,631,514, having an engine 10, variable ratio transmission 11 and rear axle 12. An implement supporting hitch 14 may comprise a pair of lower links 15 and a top link 16 mounted for limited universal movement on the center housing 17 of the rear axle. An implement, e.g., a plow (not shown) may be mounted on the hitch 14.

Figure 5:
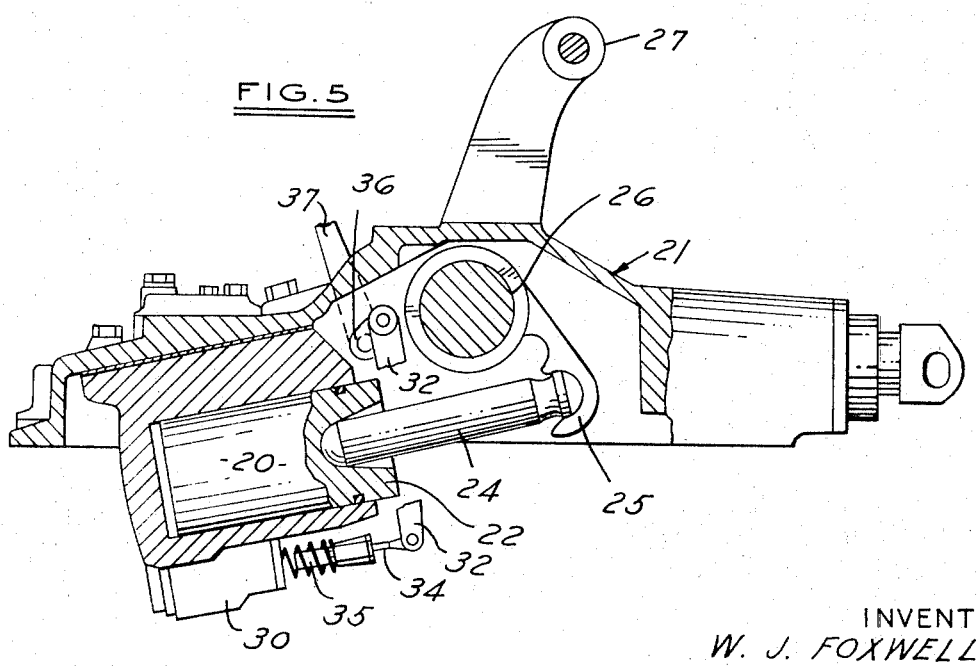
FIG. 5 is a vertical section taken through the cover and hydraulic lift system.

The hitch 14 and attached implement may be raised by means of a hydraulic lift cylinder 20 mounted on the underside of the cover 21 of the center housing. A piston 22 within the cylinder 20, by means of a short rod 24, operates a ram arm 25 to rotate a rock shaft 26 journaled within the cover 21 counterclockwise as viewed in FIG. 5 to lift the implement.

The ends of the rock shaft 26 extend through the cover 21 and lift arms 27 are fixed to the ends thereof. Lift links 29 connect the outer ends of the lift arms to the lower links 15 for lifting the links responsive to rearward movement of the piston 22 within the lift cylinder.

A hydraulic valve 30, which may be of the spool valve type, regulates flow of hydraulic fluid from a source of fluid under pressure, e.g., a hydraulic pump (not shown) to the lift cylinder 20 and flow from the cylinder 20 to a sump 31 in the bottom of the center housing. By operating the valve 30 in one direction, fluid under pressure is admitted to the lift cylinder 20 to raise the hitch, while operation of the valve in the other direction will release fluid from the lift cylinder 20 to permit the hitch 14 and supported implement to lower in response to force of gravity. In the neutral, intermediate position of the valve 30, the hydraulic fluid is trapped within the lift cylinder 20 to hold the hitch in adjusted position. The tractor as thus far described is well known and generally similar to the well-known Ford tractors presently sold throughout the world.

The hydraulic valve 30 for controlling raising and lowering of the hitch is operated by a servo lever 32 pivotally connected at its lower end to a control rod 34 which in turn operates the valve spool 35 of the valve 30. The upper end of the lever 32 is mounted on a crank 36 journaled in the cover 21 of the center housing. A quadrant or control lever 37 mounted on the outside of the cover 21 serves to rotate the crank 36 through a limited range of adjustment and thereby position the top of the servo lever 32. The position of the top of the servo lever 32 determines the value of the torque or draft under which the tractor is to be operated or the height of the hitch in the case of position control, as will be explained.

The top link 16 of the tractor attaches to the rear of a draft plunger 39 which is mounted for fore-and-aft reciprocation in the cover 21 of the center housing. A draft spring 40 biases the draft plunger 39 towards a fixed control position, compression or tension within the tractor top link 16 compressing the spring somewhat and moving the plunger forwardly or rearwardly an amount generally proportional to the stress on the top link and thereby responsive to draft of an implement carried on the hitch. This arrangement is generally conventional and provides a draft signal.

Figure 2:
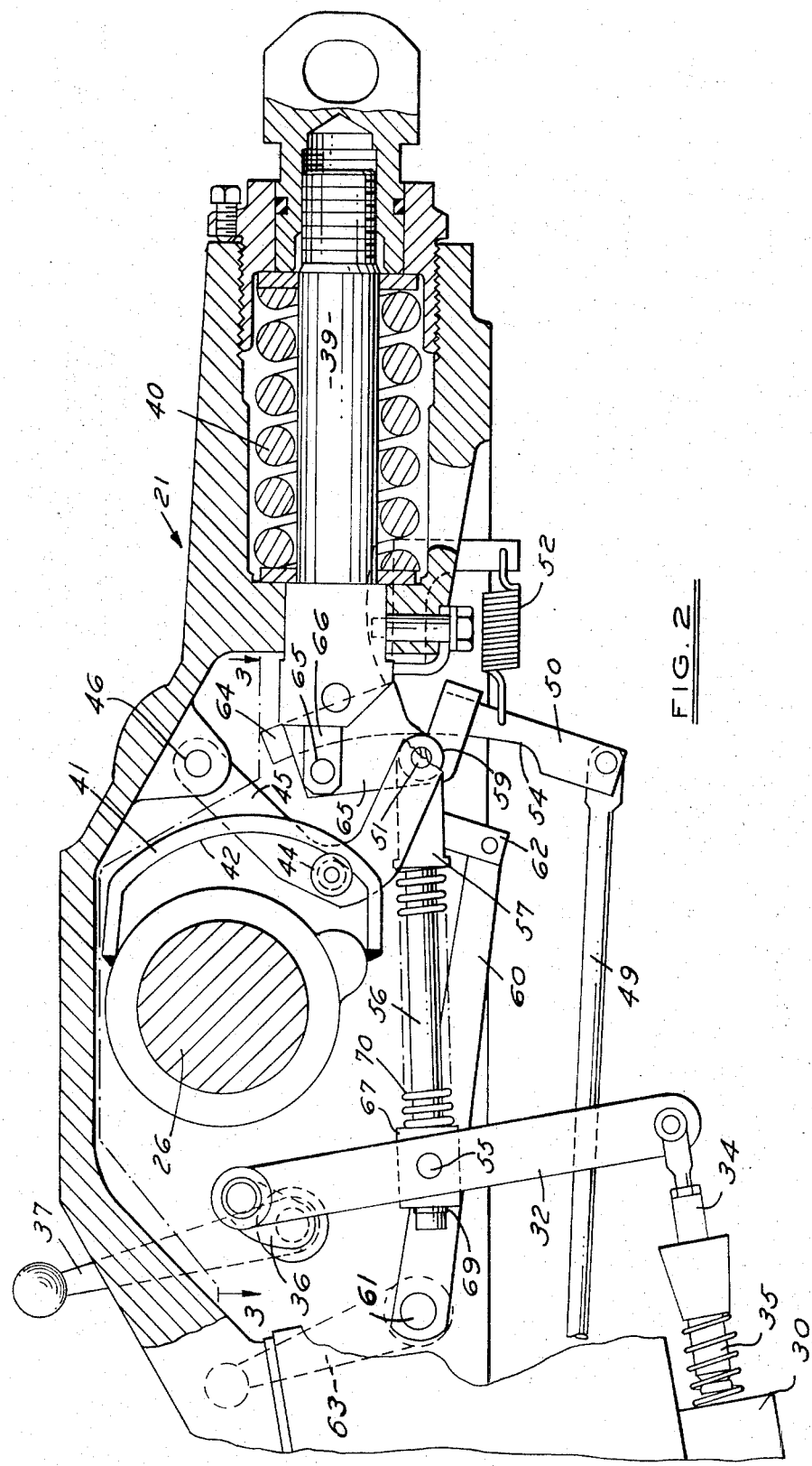
FIG. 2 is a vertical section through the hydraulic lift cylinder cover and associated parts of the implement lift system.

A cam 41 is fixed to the hub of the ram arm 25, which in turn is fixed to the rock shaft 26. The cam 41 has a cam surface 42 which may be a spiral relative to the axis of the rock shaft. A cam follower 44 is mounted on a lever 45 which may have a generally right angle configuration as indicated in the drawings, the upper end of the lever being mounted on a fixed pivot 46 mounted in the cover 21. As the rock shaft is rotated, the cam 41 rotates with the rock shaft and causes the lever 45 to move forwardly or rearwardly as shown in FIG. 2. Inasmuch as rotation of the rock shaft raises and lowers the implement hitch by means of the lift arms 27 and lift links 29, the lever 45 is positioned responsive to the height of the hitch and therefore provides for position control of the valve 30 through a mechanism to be described.

Torque control of the hitch is provided by a torque sensing device interposed in the drive train between the tractor transmission 11 and rear wheels 47 of the tractor. Preferably, torque is sensed by a coupling 48 interposed in the driveshaft in front of the rear axle, which may be as shown and described in said U.S. Pat. No. 3,575,241. Such a coupling has a coupling half displaceable responsive to torque and connected with a rod 49 leading rearwardly. The rod 49 is displaced varying amounts responsive to the amount of driveline torque and is connected to provide torque control of the valve 30 by a mechanism to be described.

The valve 30 may be operated selectively responsive to driveline torque, position control or draft control, or a combination of torque or draft control with position control. Referring to FIG. 2, a rail 50 has its upper end supported by a pivot 51 mounted on the lower, rear end portion of the lever 45 and its lower end pivotally connected to the rear end of the rod 49 extending from the torque sensing unit. A spring 52 biases the upper end of the rail 50 rearwardly to hold the cam follower 44 against the cam surface 42. The upper end of the rail 50 is moved forwardly and rearwardly responsive to position control, while the lower end of the rail is moved forwardly and rearwardly responsive to torque in the drive line. The lever 45 is attached to an offset portion 54 of the rail 50, see FIG. 3, and the forward edge 54 of the rail is given an arcuate form for at least a portion of its length, the center of arc being located at a pivot 55 located in an intermediate portion of the servo lever 32.

A selector rod 56 is supported on the pivot 55 and has a bifurcated rear end 57 supporting a roller 59 (see FIG. 3) adapted to move along the arcuate forward edge 54 of the rail 50. Preferably, the bifurcated end 57 projects on both sides of the rail to maintain the roller 59 on the rail. A lever 60 fixed to a pivot 61 journaled in the lift cover and a link 62 serve to support the rear end of the selector rod 56 in adjusted position along the rail 50. A hand lever 63 on the outside of the center housing cover 21 serves as a means for manually adjusting the position of the selector rod.

Inasmuch as the lever 45 is connected to the offset portion 54 of the rail 50, the arcuate edge of the rail is clear to receive the selector rod 56 and when the rod is positioned as shown in the drawings with the rear end of the rod opposite the pivot 51, the selector rod will be acted on solely in response to the lever 45 which is actuated responsive to height of the hitch (position control). As the selector rod 56 is moved downwardly along the rail, it reflects a combination of position control and torque control sensed by the coupling in the drive line. Preferably, the movement towards the connection of the rod 49 is limited so as to feed in some position control in order to cut off hydraulic flow through the valve 30 and prevent overcorrecting and hunting that might occur under only torque control. The selector rod 56 may be locked in any of several different positions along the rail 50 to select different ratios of torque control and position control.

A second rail 64 having an arcuate forward edge is located above and in continuation of the rail 50, the lower end of the rail 64 having an offset portion 65 received and supported by the pivot 51 on the rear end of lever 45 so as to move the lower end of the rail 64 together with the upper end of the rail 50 in response to height of the hitch (position control).

The upper end of the second rail 64 is supported by a pin 65 received in an offset portion of the rail 64 and connected by a link 66 with the forward or inner end of the draft sensing plunger 39. The arrangement is such that position control sensing is fed into the lower end of the rail 64 and draft control sensing is fed into the upper end. The selector rod 56 may be swung upwardly from engagement with the lower rail 50 and positioned along the upper rail 64, at which time a combination of position control and draft control will be sensed. If the selector rod is swung to the top of the upper rail 64 opposite the pin 66, the rod will be actuated solely by movement of the draft sensing plunger 39.

The selector rod 56 is mounted on the servo lever 32 by a block 67 slidingly receiving the rod and pivotally mounted on the servo lever. A snap ring 69 on the forward end of the selector rod limits its rearward movement in the block 67 and an override spring 70 mounted on the rod biases the snap ring 69 against the block. This override construction, which is well known, protects the linkage against damage if the sensed draft or torque changes rapidly so as to tend to move the valve spool 35 beyond its range of movement and also permits the piston within the hydraulic lift cylinder 20 to engage the servo lever 32 at top of lift and force it rearwardly a small amount to restore the valve 30 to neutral position and cut off flow of hydraulic fluid to the lift cylinder 20.

Referring to FIG. 4, the selector rod 56 may be move along the upper rail 64 from the top where it is actuated solely responsive to draft to the upper end of the lower rail 50 where it is actuated solely responsive to position of the hitch and to the lower end of its travel where it is actuated primarily responsive to driveline torque with sufficient position control to obtain cutoff of signal. In the intermediate positions, the selector rod 56 is actuated by combinations of torque and position control or draft and position control.

We claim:

1. In a tractor having an engine, a transmission, ground driving wheels, a drive train extending between the transmission and ground driving wheels, an implement supporting hitch, a source of hydraulic fluid under pressure, a lift cylinder for controlling the height of the implement supporting hitch, and a control valve for regulating admission of fluid to and release of fluid from said cylinder, the improvement comprising:

a servo-lever means coupled to said control valve, a draft sensing means coupled to the servo-lever means through a selector rod to actuate the control valve to raise or lower the implement supporting hitch in response to deviations from a predetermined draft load on the tractor, a torque-sensing means in the drive train coupled to the servo-lever means through the selector rod to actuate the control valve to raise or lower the implement supporting hitch in response to deviations in drive line torque above or below a predetermined norm, and a control means coupled to the servo-lever means to pre-set the control valve to automatically maintain the height of the implement hitch at a predetermined setting when the draft and torque conditions are at the desired norm.

2. In a tractor according to claim 1, in which:

a selector rod movement programming means is interposed between the selector rod and the draft and torque-sensing means, and a selector rod positioning means coupled to the selector rod is operable to position the latter relative to the programming means so that the selector rod is responsive to a resultant movement of the sensing means and the setting of the hitch height control means.

3. In a tractor according to claim 2, in which:

the programming means comprises a first profiled elongated member pivotally supported on a part of the draft sensing means and a second profiled member pivotally supported on a part of the torque sensing means, the first profiled member being movable in response to draft-sensing deviations as modified by hitch height setting to thereby vary the degree of actuation of the control valve by the selector rod, and the second profiled member being movable in response to torque-sensing deviations as modified by hitch height setting to thereby vary the degree of actuation of the control rod by the selector rod.

4. In a tractor according to claim 3, in which: the profiled members are pivotally connected to each other at their ends opposite their pivotally supported ends, the selector rod when positioned opposite the pivotal connection being in a neutral position relative to the draft sensing means and the torque sensing means.

5. In a tractor according to claim 4, in which:

the first and second profiled members lie in end to end relationship and provide a control surface lying generally in a circular arc about a pivot located intermediate the ends of the servo-lever means, the selector rod being swingable about the last mentioned pivot along said arc.

* * * * *